United States Patent [19]

Ishikawa

[11] Patent Number: 4,628,331

[45] Date of Patent: Dec. 9, 1986

[54] INK MIST COLLECTION APPARATUS FOR INK JET PRINTER

[75] Inventor: Chuji Ishikawa, Tokyo, Japan

[73] Assignee: Ricoh Company, Ltd., Tokyo, Japan

[21] Appl. No.: 322,621

[22] Filed: Nov. 18, 1981

[30] Foreign Application Priority Data

Nov. 18, 1980 [JP] Japan .............................. 55-162193

[51] Int. Cl.4 .............................................. G01D 15/18

[52] U.S. Cl. ................................. 346/75; 346/140 IR

[58] Field of Search .............................. 346/75, 140 IJ

[56] References Cited

U.S. PATENT DOCUMENTS

| | | | |
|---|---|---|---|
| 3,854,399 | 12/1974 | Keur et al. | 346/75 X |
| 3,981,020 | 9/1976 | Takano et al. | 346/75 |
| 4,024,548 | 5/1977 | Alonso et al. | 346/75 X |
| 4,084,164 | 4/1978 | Alt et al. | 346/75 |
| 4,369,450 | 1/1983 | Iwagami et al. | 346/75 |

*Primary Examiner*—George H. Miller, Jr.

*Attorney, Agent, or Firm*—David G. Alexander

[57] ABSTRACT

An ink mist collection apparatus for an ink jet printer comprises an ink mist adsorptive member interposed between a paper sheet and an ink jet head in order to adsorb an ink mist which is produced by an ink droplet ejected from the ink jet head upon impingement of the ink droplet on the paper sheet. The adsorptive member may be made up of a first adsorptive member and a second adsorptive member. The first member is disposed between the paper sheet and deflection electrodes to adsorb an ink mist while the second member is held in contact with the first member. The adsorptive member may be detachably mounted on a guide member which is located between the paper sheet and the ink jet head. The front end of the guide member adjacent to the paper sheet is protruded beyond the front end of the adsorptive member. The adsorptive member on the guide member may have its front surface spaced from the paper sheet more at its intermediate portion than at its opposite end portions.

10 Claims, 9 Drawing Figures

INK MIST COLLECTION APPARATUS FOR INK JET PRINTER

BACKGROUND OF THE INVENTION

The present invention generally relates to an improvement in apparatuses installed in ink jet printers for collecting an ink mist which is entailed by impingement of an ink droplet ejected from an ink jet head onto a paper sheet. More particularly, the present invention is concerned with an improvement in an ink mist collection apparatus of the type which employs an ink mist adsorptive member interposed between the paper sheet and the ink jet head.

In an ink jet printer, it is known that an ink droplet issued from an ink jet head is partly scattered to form an ink mist when it impinges on a paper sheet. The ink mist tends to be deposited on the paper sheet to smear it and/or stick to deflection electrodes to cause a leak thereacross, degrading the reproduction of desired information.

Some implements have hitherto been proposed to settle such a problem originating from ink mists. An ink mist collector is known which comprises an ink mist adsorptive member disposed between a paper sheet and deflection electrodes such that it adsorbs ink mists formed by ink droplets. A drawback inherent in this type of ink mist collector lies in the limited adsorption capacity which makes a long time of use of such a collector difficult. Another prior art ink mist collector is designed for a prolonged time of service and, for this purpose, it uses a double-layer adsorptive member between a paper sheet and deflection electrodes. Despite such an effort to increase the adsorption capacity, the limited available spacing between the paper sheet and the deflection electrodes still prevents the adsorptive member from having a sufficient volume. A farther prior art ink mist collector relies on a pump or like means for forced collection of ink mists. Though positive in nature, this type of mist collector suffers from an increase in cost due to the use of a pump or like forcible collection means.

In the adsorption type mist collectors, the adsorptive member protrudes toward a paper sheet beyond the front end of the ink jet head. When a paper sheet is inserted into the printer, its leading end will contact the adsorptive member to be thereby smeared. Likewise, a computer format sheet or like folded sheet will be smeared by the adsorptive member along its folds.

Furthermore, the ink mist adsorptive member in such a prior art collector is securely mounted inside a head cover by screws or the like to a carriage which has a head, electrodes and others mounted thereon. To replace the adsorptive member, therefore, one has to remove the head cover and then loosen the screws to remove the adsorptive member. Meanwhile, since the degree of contamination of the adsorptive member is not visible from outside the head cover, an appropriate timing for the replacement of the adsorptive member cannot be known.

SUMMARY OF THE INVENTION

It is an object of the present invention to provide an ink mist collection apparatus for an ink jet printer which can collect an ink mist around a paper sheet and deflection electrodes in a forcible and efficient manner.

It is another object of the present invention to provide an ink mist collection apparatus for an ink jet printer which is furnished with an ink mist adsorptive member having a large adsorption capacity.

It is another object of the present invention to provide an ink mist collection apparatus for an ink jet printer which is incostly yet withstands a long time of use.

It is another object of the present invention to provide an ink mist collection apparatus for an ink jet printer which permits one to check the contamination of an ink mist adsorptive member at a sight.

It is another object of the present invention to provide an ink mist collection apparatus for an ink jet printer which permit an adsorptive member to be bodily removed from the printer for replacement or rinsing.

It is another object of the present invention to provide an ink mist collection apparatus for an ink jet printer which is capable of preventing a paper sheet from contacting an adsorptive member to be thereby smeared.

It is another object of the present invention to provide an ink mist collection apparatus for an ink jet printer which successfully avoids a leak across deflection electrodes which is attributable to ink mist deposition thereon.

It is another object of the present invention to provide a generally improved ink mist collection apparatus for an ink jet printer.

In one aspect of the present invention, there is provided an ink mist collection apparatus which comprises a first ink mist adsorptive member which is interposed between a paper sheet and deflection electrodes to adsorb an ink mist entailed by impingement of an ink droplet issued from an ink jet head onto the paper sheet, and a second ink mist adsorptive member fixed in place in contact with the first ink mist adsorptive member.

In another aspect of the present invention, there is provided an ink mist collection apparatus which has a cover or casing whose upper end is partly openable. With this construction, not only the adsorptive member can be replaced with ease but contamination of the adsorptive member can be checked at a glance to know an appropriate time for replacement.

In a farther aspect of the present invention, there is provided an ink mist collection apparatus which comprises a guide member disposed between a paper sheet and an ink jet head, and an ink mist adsorptive member detachably mounted on the guide member. The front end of the guide member adjacent to the paper sheet is protruded beyond the front end of the adsorptive member. The adsorptive member is at a larger spacing from the paper sheet at its intermediate portion than at its opposite end portions.

Other objects, together with the foregoing, are attained in the embodiments described in the following description and illustrated in the accompanying drawings.

DESCRIPTION OF THE PREFERRED EMBODIMENT

While the ink mist collection apparatus for an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
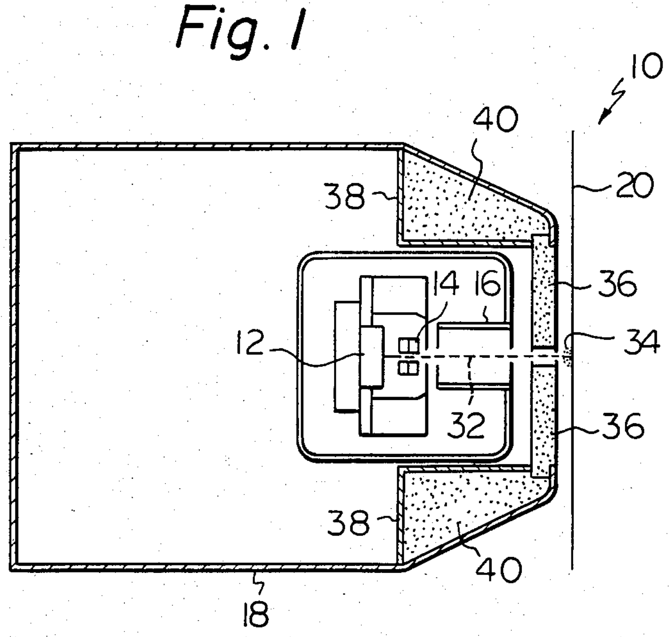
FIG. 1 is a fragmentary sectional plan view of an ink jet printer equipped with an ink mist collection apparatus embodying the present invention.
Figure 2:
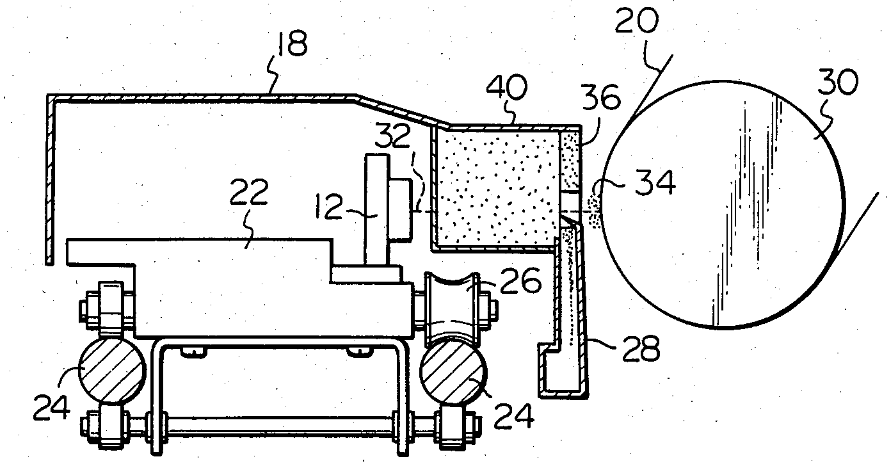
FIG. 2 is a fragmentary sectional side elevation of the printer shown in FIG. 1.

Referring to FIGS. 1 and 2 of the drawings, an ink jet printer generally denoted by the reference numeral 10 is shown to comprise an ink jet head 12, charging and phase searching electrodes 14, deflection electrodes 16 and a cover or casing 18. A paper sheet 20 as a recording medium is located in front of the ink jet head 12 and passed around a platen 30. The ink jet head 12, charging electrodes 14 and deflection electrodes 16 are mounted on a carriage 22 which is in turn guided by guide rollers 26 to run along carrier shafts 24. The reference numeral 28 designates a gutter for collecting ink droplets which do not join in data reproduction. As well known in the art, ink droplets 32 are ejected from the ink jet head 12 to print dots on the paper sheet 20 on the platen 30 while the carriage 22 is moving in a given direction along the carrier shafts 24. As previously mentioned, an ink droplet 32 produces an ink mist 34 upon its impingement on the paper sheet 20 thereby deteriorating the quality of data reproduction.

An ink mist collector associated with this printer comprises a first adsorptive member 36 and a second adsorptive member 40 cooperating with the first adsorptive member 36. The first adsorptive member 36 is located between the paper sheet 20 and the deflection electrodes 16. The second adsorptive member 40 consists of two parts which are filled in spaces within the casing 18 (mainly laterally opposite portions) which are defined by partition walls 38. The second adsorptive member 40 is held in contact with the first adsorptive member 36 to absorb ink mists which the first adsorptive member 36 adsorbed. The first adsorptive member 36 is formed of a porous metal while the second adsorptive member 40 may comprise a porous metal member, a hydrophilic member, a block of sponge or a resinous porous member. The effect will become more prominent if the second adsorptive member 40 is made larger in capacity than the first adsorptive member 36.

Figure 3:
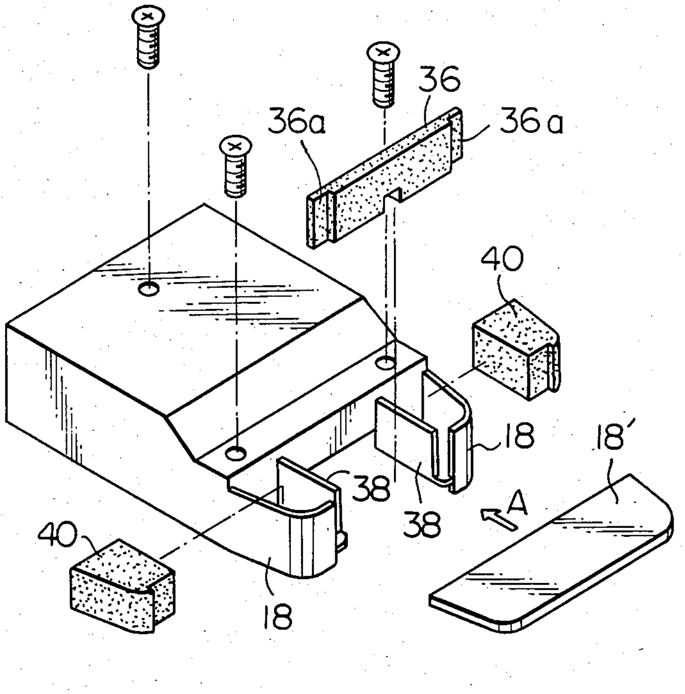
FIG. 3 is a fragmentary exploded perspective view of the printer shown in FIG. 1.
Figure 4:
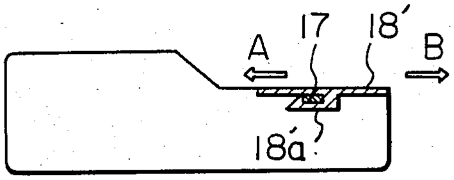
FIG. 4 is a fragmentary sectional side elevation of the printer of FIG. 1.

The first and second adsorptive members 36 and 40 are replacably mounted in the casing 18. As viewed in FIG. 3, the upper end of the casing 18 is partly closed by a removable front cover 18'. When this front cover 18' is removed from the casing 18, contamination of the adsorptive members 36 and 40 can be visually checked and, if necessary, they can be readily replaced with fresh ones. The first adsorptive member 36 is formed with shoulders 36a at its lateral opposite ends while the casing 18 is slotted at its front portion to snugly receive the shoulders 36a. When inserted into the slots of the casing 18, the thus shaped adsorptive member 36 is automatically positioned in the casing 18. Likewise, the second adsorptive members 40 can be properly positioned in the casing 18 merely by inserting them from above into the casing 18. In this way, the first and second adsorptive members 36 and 40 are easily movable into and out of the predetermined positions in the casing 18. After the adsorptive members 36 and 40 have been mounted as stated above, the front cover 18' is moved on and along the top of the casing 18 from the platen side in the direction indicated by an arrow A until a pawl 18'a on the underside of the front cover 18' is brought into locking engagement with a latch member 17 inside the casing 18, as shown in FIG. 4. In this position, the front cover 18' is locked to the casing 18 fixing the adsorptive members 36 and 60 in their predetermined positions. A push of the front cover 18' in the other direction indicated by an arrow B will disengage the pawl 18'a from the latch member 17 to permit the front cover 18' to be removed with ease from the casing 18. By so removing the front cover 18', one can readily see whether the adsorptive members 36 and 40 have been contaminated and, if so, replace them with fresh ones. Thereafter, the front cover 18' is caused to slide on the casing 18 in the direction A until it is locked again to the casing 18 to in turn fix the adsorptive members 36 and 40 in position.

Thus, the ink mist collector described hereinabove eliminates the need of a pump or like means for forced collection of ink mists with the resultant cut-down in cost. Additionally, the use of a large capacity adsorptive member allows the ink mist collector to endure a long time of use.

Furthermore, the ink mist collector of the present invention includes a casing which is partly openable (front cover) at its upper end. Such a design facilitates easy observation of the degree of contamination of the adsorptive members. Meanwhile, replacement of the adsorptive members can be performed easily to promote improved services because they are movable into predetermined positions when merely inserted into the casing and lockable in said positions by the front cover.

Figure 5:
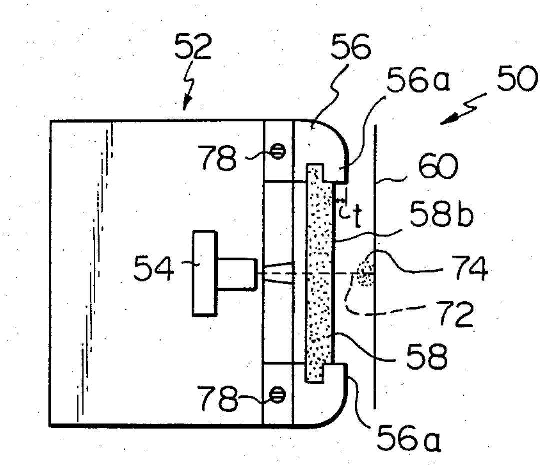
FIG. 5 is a plan view of a carriage included in an ink jet printer which is furnished with an ink mist collection apparatus according to another embodiment of the present invention.

Referring to FIG. 5, there is shown an ink jet printer 50 with an ink mist collector according to another embodiment of the present invention. The printer 50 includes a carriage 52, an ink jet head 54, a platen 62 over which a paper sheet 60 is passed, rollers 64 pressing the paper sheet 60 against the platen 62, a gutter 66, carrier shafts 68 and guide rollers 70. While the carriage 52 is moving in a given direction along the carrier shafts 68, ink droplets 72 are ejected from the ink jet head 54, selectively charged and deflected by charging and deflecting electrodes (not shown) based on image signals and then hit against the paper sheet 60 in a well known manner. Again, an ink droplet 72 impinged on the paper sheet 60 forms an ink mist 74 which will be deposited on the paper sheet 60 to detriment quality reproduction of desired data.

Figure 7:
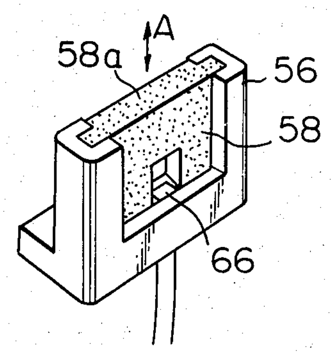
FIG. 7 is a perspective view showing an example of an ink mist adsorbing portion of the ink mist collection apparatus indicated in FIGS. 5 and 6.

An ink mist collector associated with this printer 50 comprises an ink mist adsorptive member 58 which is detachably mounted on a guide member 56 which is in turn fixed to a carriage base by suitable fastening means such as screws 78. The movable direction of the adsorptive member 58 into or out of operative position on the guide member 58 is indicated by a double-headed arrow A in FIG. 7. As viewed in a side elevation, the adsorptive member 58 has convexity at one side thereof (see the surface 58a in FIG. 7). The adsorptive member 58 received in the guide member 56 is properly positioned when a casing 76 of the printer is fixed in a predetermined position.

Figure 6:
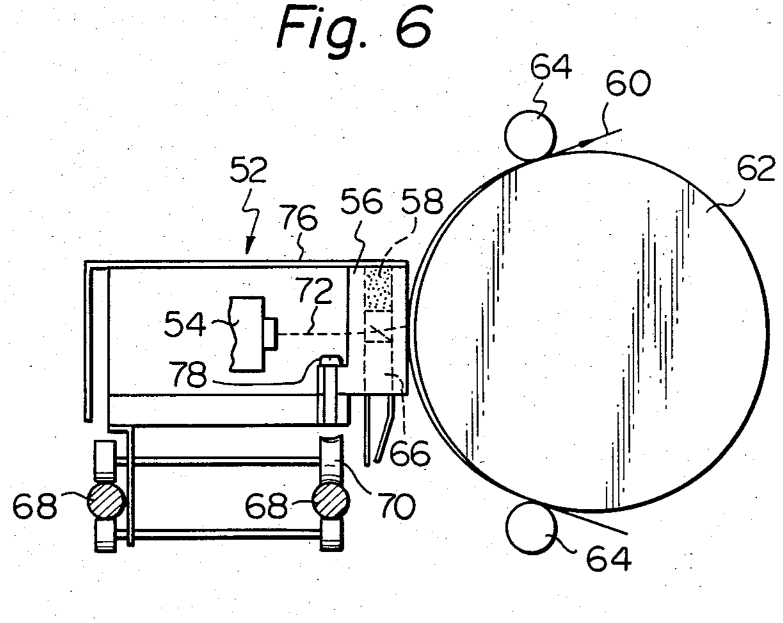
FIG. 6 is a side elevation of the printer shown in FIG. 5.
Figure 8:
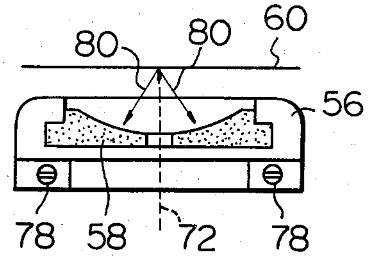
FIG. 8 is a plan view showing another example of the ink mist adsorbing portion of the ink mist collection apparatus of FIGS. 5 and 6.

In this manner, the adsorptive member 58 alone is readily removable from the printer and can be replaced or rinsed when a substantial amount of ink is found deposited thereon. The front end 56a of the guide member 56 may be configured to protrude beyond the front end 58b of the adsorptive member 58 by a distance t as indicated in FIG. 5. Then, if the paper sheet 60 accidentally becomes floated between the rollers 64 as shown in FIG. 6, it will abut against the front end 56a of the guide member 56 but not against the adsorptive member 58 and be thereby prevented from accidental contamination. Furthermore, the adsorptive member 58 may be so constructed that as shown in FIG. 8 it will be spaced from the paper sheet more at its intermediate portion than at its opposite end portions in order to promote more effective measure against smearing the paper sheet. Where such a distance distribution of the adsorptive member 58 with respect to the paper sheet is established by an inwardly curved surface as indicated in FIG. 8, collection of ink mists will be carried out more positively because each microscopic particle of an ink mist impinges on a surface which is substantially perpendicular to the advancing direction of the particle.

Figure 9:
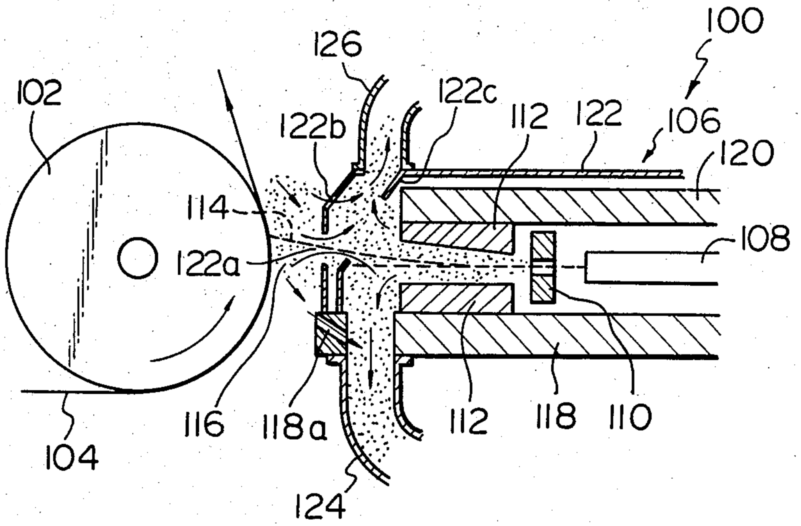
FIG. 9 is a schematic fragmentary view of an ink jet printer representing a farther embodiment of the present invention.

Referring to FIG. 9, an ink jet printer representing a farther embodiment of the present invention is shown. The printer generally denoted by the reference numeral 100 includes a platen 102 with a paper sheet 104 passed therearound, an ink jet head 108, a carriage 106 mounting the ink jet head 108 thereon, charging electrodes 110 and deflection electrodes 112. While the carriage 106 is travelling relative to the paper sheet 104, the ink jet head 108 ejects ink droplets 114 in a well known manner to print dots on the paper sheet 104. As has been the case with the other printers, an ink droplet 114 would produce an ink mist 116 when impinged on the paper sheet 104; the ink mist 116 would adhere to the paper sheet 104 to deteriorate the data reproduction and/or to the deflection electrodes 112 inviting a leak thereacross. The printer also includes a carriage base 118, an electrode holder 120 and a casing 122.

A pipe 124 for collection of ink mists 116 is rigidly connected to the carriage base 118 while a second collection pipe 126 is rigidly connected to the casing 122. A weak vacuum is communicated to the collection pipes 124 and 126 so that streams of air are generated as indicated by arrows. These air streams carry ink mists into the collection pipes 124 and 126 via a channel 118a formed in the carriage base 118, an outlet for ink droplets 122a in the casing 122 and an aperture 112b in the casing 122. The channel 118a in the carriage base 118 is somewhat offset from the leading end of the casing 122 so that, when ink mists deposited on the outer surface of the casing 122 join each other to form larger droplets and fall down along the casing 122, they can be safely collected into the pipe 124 through the channel 118a.

A tongue 122c extends forward and downward from the electrode holder 120 to neighbor the front end of the electrode holder 120 at a suitable spacing. When ink mists deposited on the inner wall of the collection pipe 126 form larger ink droplets and fall down along said inner wall, the tongue 122c prevents them from adhering to the deflection electrodes 112 and thereby eliminates a leak across the deflection electrodes.

It will be seen that the ink mist collector of FIG. 9 positively avoids a leak across the deflection electrodes 112 by forced collection under suction of ink mists which are floating around the deflection electrodes 112. At the same time, the ink mist collector avoids smearing the paper sheet 104 by virtue of the forcible collection of ink mists adjacent to the paper sheet through a plurality of suction holes which are formed in the casing 122.

Various modifications will become possible for those skilled in the art after receiving the teachings of the present disclosure without departing from the scope thereof.

What is claimed is:

1. An ink jet printing apparatus comprising:
an ink jet head for ejecting a jet of ink;
charging means for electrostatically and selectively charging ink droplets separated from the ink jet;
deflection means for electrostatically deflecting the charged ink droplets; and
ink mist adsorbing means interposed between a paper sheet and said ink head for adsorbing an ink mist produced by said charged ink droplets upon impingement of the ink droplets on the paper sheet;
said ink adsorbing means comprising a first adsorptive member disposed between the paper sheet and deflection means and a second adsorptive member which is held in contact with the first adsorptive member to thereby adsorb the ink mist which is adsorbed by the first adsorptive member;
the adsorption capacity of said second adsorptive member being larger than that of said first adsorptive member, the second adsorptive member extending outwardly from the first adsorptive member in a direction perpendicular to the ink jet.

2. An ink jet printing apparatus as claimed in claim 1, in which said first adsorptive member comprises a porous metal member, and the second adsorptive member comprises at least one of a porous metal member, a hydrophilic member, a block of sponge and a resinous member.

3. An ink jet printing apparatus as claimed in claim 1, further comprising a casing in which said ink mist adsorbing means is detachably mounted.

4. An ink jet printing apparatus as claimed in claim 3, in which said second adsorptive member is replaceably mounted in the casing.

5. An ink jet printing apparatus as claimed in claim 1, further comprising guide means located between the paper sheet and the ink jet head for mounting the first adsorptive member thereon.

6. An ink jet printing apparatus as claimed in claim 5, in which said first adsorptive member is detachably mounted on the guide means.

7. An ink jet printing apparatus as claimed in claim 5, in which the front end of the guide means adjacent to the paper sheet is protruded beyond the front end of the first adsorptive member.

8. An ink jet printing apparatus as claimed in claim 5, in which the first adsorptive member on the guide means has a concave surface facing the paper sheet which is shaped in such a manner that each microscopic particle of the ink mist impinges on said concave surface substantially perpendicular to the advancing direction of the particle.

9. An ink jet printing apparatus comprising:

an ink jet head for ejecting a jet of ink;

charging means for electrostatically and selectively charging ink droplets separate from the ink jet;

deflection means for electrostatically deflecting the charged ink droplets; and ink mist adsorbing means interposed between a paper sheet and said ink head for adsorbing an ink mist produced by said charged ink droplets upon impingement of the ink droplets on the paper sheet;

said ink adsorbing means comprising an adsorptive member disposed between the paper sheet and deflection means to thereby adsorb the ink mist;

the adsorptive member being formed with a concave surface facing the paper sheet which is shaped in such a manner that microscopic particles of the ink mist impinge on said concave surface substantially perpendicular to an advancing direction of the particles,

10. An ink jet printing apparatus as claimed in claim 9, in which the adsorptive member is formed with an opening through which the ink jet passes from the ink jet head to the paper sheet.

* * * * *